United States Patent [19]

Hasl et al.

[11] Patent Number: 4,563,148
[45] Date of Patent: Jan. 7, 1986

[54] BLOW MOLDING LABEL TRANSFERRING APPARATUS

[76] Inventors: Siegfried C. Hasl, 80 Liberty Corner, Warren, N.J. 07060; Werner F. F. Jahnel, 2 Eichenstr, 8061 Rumeltshausen, Fed. Rep. of Germany

[21] Appl. No.: 524,236

[22] Filed: Aug. 18, 1983
(Under 37 CFR 1.47)

[51] Int. Cl.$^4$ .................. B29C 17/07; B65H 3/08; B65H 3/46
[52] U.S. Cl. .................. 425/503; 425/116; 425/125; 425/126 R; 425/522
[58] Field of Search .................. 425/522, 116, 126 R, 425/503, 125; 156/572, 500, 242

[56] References Cited

U.S. PATENT DOCUMENTS

| | | | |
|---|---|---|---|
| 2,601,700 | 7/1952 | Pinsky | 425/105 |
| 3,072,969 | 1/1963 | DuBois | 264/509 |
| 3,108,850 | 10/1963 | Brandt | 264/509 |
| 3,151,193 | 9/1964 | Thornton | 264/509 |
| 3,194,857 | 7/1965 | White | 425/105 |
| 3,207,822 | 9/1965 | Makowski | 264/509 |
| 3,227,787 | 1/1966 | Battenfeld | 264/509 |
| 3,267,186 | 8/1966 | Battenfeld | 264/509 |
| 3,272,681 | 9/1966 | Langecker | 264/132 |
| 3,287,198 | 11/1966 | Battenfeld | 264/132 |
| 3,292,209 | 12/1966 | Borkmann | 425/126 R |
| 3,324,508 | 6/1967 | Dickinson | |
| 3,438,085 | 4/1969 | Larkin | 425/166 |
| 3,503,826 | 3/1970 | Nasica | 156/245 |
| 3,518,335 | 1/1970 | Jablonski | 264/501 |
| 3,559,248 | 2/1971 | Stockmann | 425/504 |
| 3,608,020 | 9/1971 | Langecker | 264/509 |
| 3,657,405 | 4/1972 | Langecker | 264/509 |
| 3,801,689 | 4/1974 | Langecker | 264/509 |
| 4,233,262 | 11/1980 | Curto | 264/509 |
| 4,289,817 | 9/1981 | Valyi | 428/35 |
| 4,307,058 | 12/1981 | Morello | 264/510 |
| 4,323,411 | 4/1982 | Uhlig | 156/245 |
| 4,335,635 | 6/1982 | Hautemont | 264/509 |
| 4,339,409 | 7/1982 | Curto | 264/509 |
| 4,355,967 | 6/1982 | Hellmer | 425/503 |
| 4,359,314 | 11/1982 | Hellmer | 425/503 |
| 4,397,625 | 8/1983 | Helmer et al. | 425/583 |
| 4,479,644 | 10/1984 | Bartimes et al. | 425/503 |

Primary Examiner—Willard E. Hoag
Attorney, Agent, or Firm—Larson & Taylor

[57] ABSTRACT

The label transferring device for placing labels in a separable mold of a blow molding machine which includes a pair of movable platens which converge the mold portions and also move in unison to different blow molding stations of the machine. An articulating arm is mounted directly on one of the platens and includes a vacuum section head to transport the labels. The articulating arm moves the carrying head from a label supply magazine which is also mounted on the platen to a labeling position between the molds, so that both the articulating arm and supply magazine are carried by the platen as it moves to different blow molding stations. Preferably, an articulating arm having a plurality of carrying heads is mounted on each platen along with a label supply magazine.

9 Claims, 4 Drawing Figures

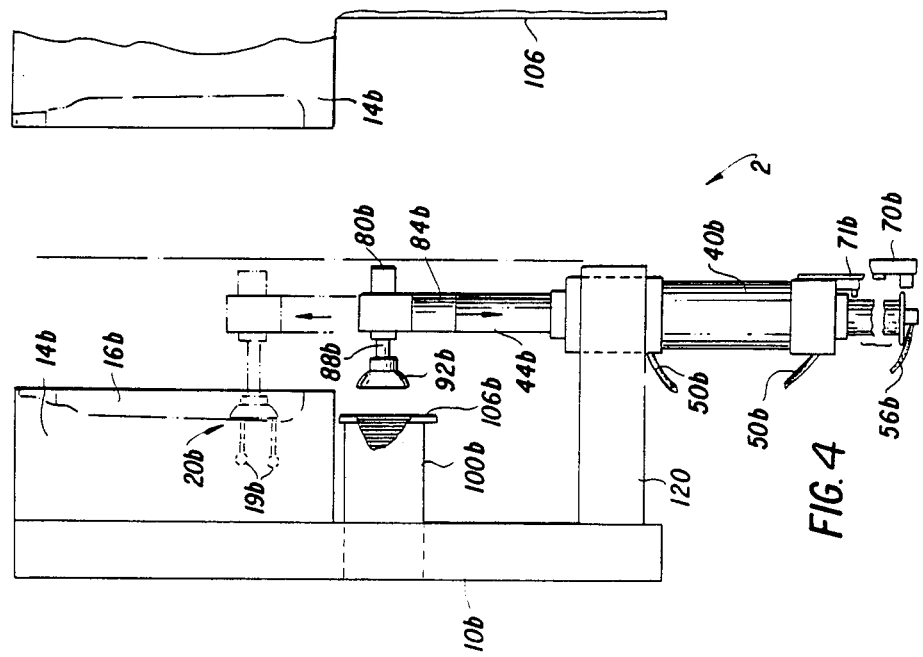
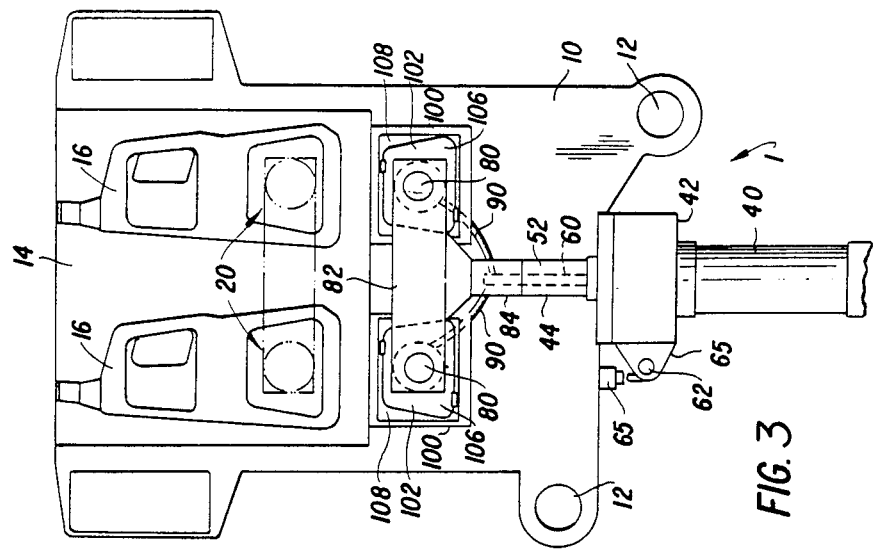

BLOW MOLDING LABEL TRANSFERRING APPARATUS

BACKGROUND OF THE INVENTION

The present invention relates to in-mold labeling devices and in particular to in-mold label transferring devices for blow molding machines which include a pair of mold carrying platens which move between various stations within the machine.

Blow molding machines of various designs are used to blow mold hollow objects such as bottles or the like. One typical machine utilizes a pair of movable platens which each carry a mating mold section. These platens are movable to converge and separate the mold sections, and also move in unison from one operation station within the machine to another so that various steps in the blow molding process may take place simultaneously on different sets of platens.

Machines of the type mentioned above normally utilize some type of extrusion device or similar process to produce a molding material parison. While the mold is open and the platens separated, the platens are shifted in order to position the mold around the parison. The platens are converged to close the mold and are then moved to a calibration station where the bottle is blown.

With such blow molding machines, it is beneficial to apply container labels to the bottles during the blowing process. A preprinted plastic label, more particularly, can be thermoplastically bonded to the bottle during the blowing process, obviating the otherwise necessary step of applying a label during a subsequent operation. Such preprinted plastic labels applied during the molding process are much more resistant to abrasion, can be more readily aligned and, in general, make for a more attractive product package than can be achieved by utilizing a post-blowing labeling operation. Various methods have been used to place labels within molds to take advantage of these improved results. For example, a variety of label placing arms have extended from the machine frame to place the label within the open mold. Other methods insert the label through a separate opening and into the mold or apply a labeling ink to the mold surface.

Various difficulties are experienced with the methods set forth above. The platens and molds must be precisely registered with the label applying apparatus in order for the label to be placed properly on the mold and thus on the blown object. This alignment is often difficult to achieve with such moving platens, since platen and mold open time is desired to be kept at a minimum. For this reason, the label transferring operation must be performed very rapidly. Additionally, some labelingg devices require that the platens remain stationary throughout the label placement procedure. The platens may not move from one station to another during the label transferring process, which increases the amount of time required for each cycle of the blow molding machine and therefore reduces the machine's production capacity.

SUMMARY OF THE INVENTION

The present invention is embodied in a label transferring device which places labels in the separable mold sections of a blow molding machine of the type which has a pair of movable platens used to separate and converge the mold halves. These platens also move together from one station in the blow molding machine to the next, and therefore carry both sections of the mold to the different stations. The label transferring device is mounted directly to one of the platens so that it is carried with the mold sections as they are moved between the different blow molding stations. The transferring device includes a carrying head for the label, a means to position the carrying head between the separated mold sections and a means to transfer the label from the carrying head to the proper location in the mold. A label supply is also carried on the platen so that the carrying head can move between it and the mold as the platens shift between stations. Preferably, a second label applying assembly is mounted on the other platen so that a label can be placed in both sides of the mold when so desired.

With the above device, the mechanism which places the label within the mold is always maintained in registry with the mold. This relieves any misalignment problems experienced with other label transferring techniques. Further, this labeling device reduces the cycle time for the blow molding machine, since the labeling device can be placing a label into the open mold while the platens are moving the mold between different stations on the machine. Therefore, the platens are not required to remain stationary after discharging the previous set of bottles, but may immediately begin moving toward a new parison to start a new molding cycle.

These and other aspects and advantages of the invention will be appreciated by those skilled in the art from the description, claims and drawings which follow.

BRIEF DESCRIPTION OF THE DRAWINGS

FIG. 3 is a front-elevational view taken along part line III—III of FIG. 2 in between the separated mold sections with the transfer device shown in phantom in a label applying position; and FIG. 4 is a side-elevational view of another embodiment of a label transferring device used to transfer labels to only one side of a mold, shown in phantom with the device placing a label into the mold.

DETAILED DESCRIPTION OF THE PREFERRED EMMBODIMENTS

Figure 1:
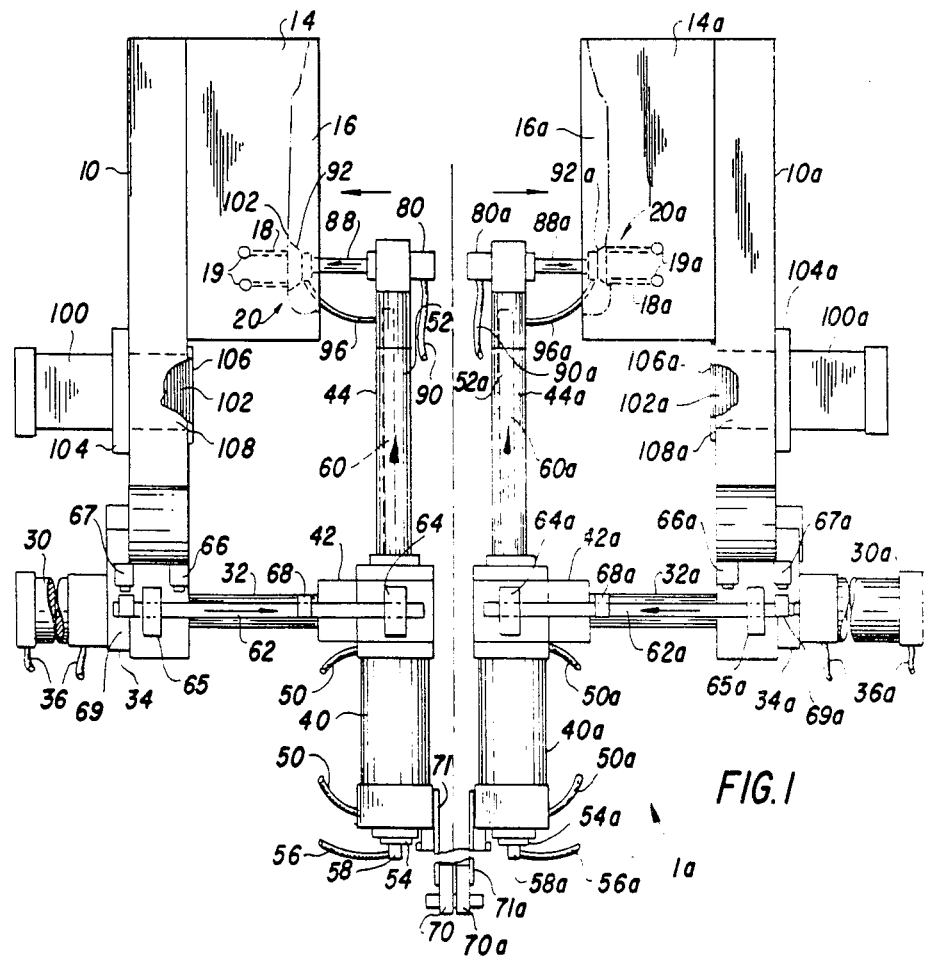
FIG. 1 is a side-elevational view of a label transferring device embodying the present invention, shown with the platens separated and the device applying a set of labels to the mold.
Figure 2:
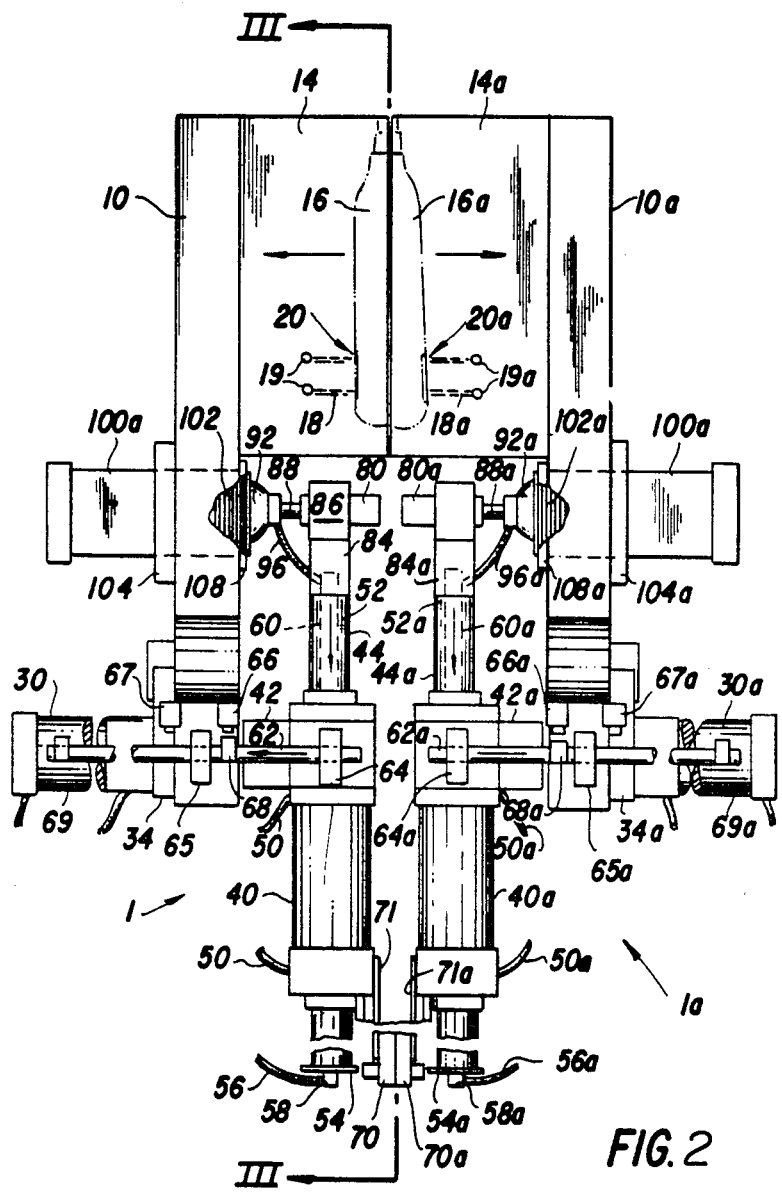
FIG. 2 is a side-elevational view of the device of FIG. 1, shown with the platens and mold sections closed together and the label transferring device obtaining a new label from the label supply.

In the preferred embodiment shown in FIGS. 1-3, label transferring devices 1 and 1a are mounted directly to each of a pair of spaced, movable platens 10, 10a so as to move with the platens as they shift a pair of mold halves 14, 14a between different stations in a blow molding machine. Label transferring devices 1 and 1a are used to place container labels in mold halves 14, 14a so that the labels will be attached onto the blown object, such as a bottle or the like, during the blowing process. Label supply magazines 100, 100a are also attached to platens 10, 10a, respectively, so that label transferring devices 1, 1a may also pick up a new label from magazines 90, 90a while platens 10 and 10a are being shifted.

Another label transferring device is disclosed claimed in co-pending application, entitled LABEL TRANS- FERRING APPARATUS FOR BLOW MODING MACHINES HAVING MOVABLE INSERTS, Ser. No. 524,192, which was filed on even date with the present application. That application also discloses and claims a label transferring device which is mounted to be movable with the blow molding machine platens.

For purposes of this preferred embodiment, label transferring devices 1 and 1a are mirror images of each other, with the exception that label transferring device 1 is mounted on one of the two spaced platens, while label transferring device 1a is mounted on the other platen. Therefore, label transferring device 1 will be described in detail along with platen 10 and mold section 14, although it will be understood that the same description applies to the label transferring device 1a.

Platens 10 and 10a are substantially flat plates which are slidably joined by a pair of tie rods at mounts 12, FIG. 3, upon which platens 10 converge and separate, FIGS. 1 and 2. Platen 10 has a mold section 14 mounted on its inner facing surface so that platens 10, 10a open and matingly close mold sections 14, 14a in a manner well known in the art. Platens 10 are mounted on the particular blow molding machine in a conventional manner so as to be shiftable between various blow molding stations in the blow molding machine, as well as to allow opening and closing of mold sections 14 and 14a. Platens 10 have cooling manifolds (not shown) which pass from the platen outer surface to mold sections 14 and mate with similar cooling manifolds and bores which extend through mold halves 14. These cooling manifolds are used to circulate cooling fluid through mold sections 14 during the blow molding process and are of conventional design known in the art.

Mold half 14, FIG. 3, includes a pair of mold cavities 16 which are each configured to produce a bottle or other object of the desired shape. Within each mold cavity 16 is a label location 20 on which a label is placed to be properly located and affixed to the finished bottle during the blowing operation. Underlying label location 20 is a series of vacuum ports or ducts 18, FIGS. 1-2, which secure the label to mold section 14, as later described. Ducts 18 communicate with vacuum supply manifolds 19. Vacuum is supplied to manifolds 19 in any conventional fashion, such as by flexible tubing.

Label transferring device 1 includes a spacing hydraulic cylinder 30, FIG. 1, which is mounted directly to platen 10 and has a piston rod 32 which slidably extends to the side of platen 10 on which mold section 14 is mounted. Cylinder 30 is connected to platen 10 by a platen mount 34 which may be an integral extension of platen 10 or may be a separate mounting bracket which has been secured to platen 10 by welding or the like. Platen mount 34 rigidly secures cylinder 30 so that label transferring device 1 is maintained in registry with mold section 14 at all times. Cylinder 30 is a double-acting oil hydraulic cylinder and has a nonrotatable piston rod. Movement of piston rod 32 is positively controlled by a properly valved hydraulic fluid supply through hoses 36.

As shown in FIGS. 1-2, secured to the free end of piston rod 32 is a positioning hydraulic cylinder 40. Hydraulic cylinder 40 is rigidly (nonrotatably) mounted on piston rod 32 by a coupling 42. Positioning cylinder 40 is shifted toward and away from platen 10 as spacing cylinder 30 is activated. Preferably, coupling 42 may be a bracket or the like which is screwed into piston rod 32 by a threaded collar or by other conventional fastening means.

Positioning cylinder 40 has a piston rod 44 which extends toward mold 14 from spacer cylinder 30, and is a double-acting oil cylinder having a nonrotatable rod 44 with a centrally mounted piston. Rod 44 is sealed at both extremities of the cylinder and is of sufficient length that extremity 54 will protrude at least slightly from the cylinder when extremity 52 is fully extended. A flexible vacuum supply line 56 is connected to end 54 of rod 44 by a connector 58. Vacuum bores 60 are used to supply vacuum to the carrying elements 92 which carry the labels while they are being placed within mold 14.

Connected to coupling 42 is a control rod 62, FIGS. 1-2, used to determine when piston rod 32 has reached the inner and outer limits of its desired stroke. Control rod 62 is parallel to piston rod 32 and is connected to coupling 42 by a bracket 64 as well as being received through a sliding guide 65 mounted on platen 10. Mounted to platen 10 on either side of guide 65 are limit switches 66 and 67. Lobe 68, adjustably positioned on rod 62, contacts limit switch 66 when piston rod 32 is retracted to the desired extent, FIG. 2. Lobe 69, also adjustably positioned on control rod 62, contacts limit switch 67 when piston rod 32 is extended to the desired extent, FIG. 1.

Rod 32 of cylinder 30, in accordance with the preferred embodiment of this invention, travels between fully extended and fully retracted positions, limit switches 66 and 67 triggering other processing steps as hereinafter explained. As will be apparent to those skilled in the art, however, the positioning of rod 32 of cylinder 30 can also be controlled short of the fully extended and fully retracted positions, by limit switches 66 and 67.

Limit switch 70 is tripped by extremity 54 of rod 44 when rod 44 is retracted to the desired position. Limit switch 71, similarly, is tripped by extremity 54 when rod 44 is extended to the desired position. Again, in accordance with the preferred embodiment of this invention, these are fully extended and fully retracted positions, activation of the limit switches functioning primarily to initiate subsequent processing steps. As in the case of switches 66 and 67, however, switches 70 and 71 may be used to position rod 44 intermediate these fully extended and fully retracted positions.

Mounted on free end 52 of piston rod 44 via carriage bar 82 is a pair of placement hydraulic cylinders 80, FIGS. 1-3. Carriage bar 82 is connected to rod 44 by a coupling 84. Coupling 84 rigidly connects carriage bar 82 and hydraulic cylinders 80 to piston rod 44 so that cylinders 80 shift with rod 44 but do not pivot relative to hydraulic cylinder 40. Coupling 84 is preferably mounted on free end 52 by a threaded joint or other conventional connection. A continuation of bore 60 extends through and to the exterior of coupling 84.

Cylinders 80 have rods 88 that extend toward platen 10. Placement cylinders 80 are double-acting oil cylinders which each have flexible hydraulic supply lines 90 which lead to a hydraulic fluid supply, pump and attendant valving (not shown). On the ends of piston rods 88 are flexible vacuum cup heads 92 that have a concave cup-like vacuum surface which is connected by a flexible vacuum supply line 96 to bore 60. Placement cylinders 80 therefore shift vacuum heads 92 toward and away from platen 10.

Mounted on platen 10 intermediate spacing cylinder 30 and mold section 14 is a pair of spaced label supply magazines 100, FIGS. 1-3. As shown in FIGS. 1-2, magazines 100 contain a stacked supply of labels 102 and are mounted on platen 10 by a pair of mounting brackets 104 so as to extend through platen 10. Magazines 100 have an open end 106, FIG. 1, through which vacuum heads 92 may access labels 102, as in FIG. 2, and an annular retaining flange 108 retains labels 102 within magazines 100. Labels 102 are urged toward open end 106 by a spring or the like (not shown) so that a new label 102 is constantly maintained in contact with retaining flange 108 and accessible through open end 106. Magazines 100 are aligned with label placement locations 20—i.e., the magazines appear directly beneath the label placement locations 20 when viewed as in FIG. 3, although they are in fact laterally offset. Vacuum heads 92, thus, may be simultaneously shifted from a position horizontally aligned with label placement locations 20 to a position horizontally aligned with label magazines 100 by the actuation of positioning cylinder 40, FIGS. 1-2.

Piston rod 32 of spacing cylinder 30 has a length sufficient that when lobe 69 engages limit switch 67 positioning cylinder 40 will be spaced from platen 10 sufficiently to allow vacuum heads 92 (with rods 88 retracted) to clear mold section 14 as piston rod 44 of positioning cylinder 40 is extended, FIG. 1. However, piston rod 32 should not shift positioning cylinder 40 away from platen 10 past the part line 104 that is a bifurcating plane of the space between platens 10 and 10a, FIG. 1. Should the plane be crossed, assembly 1 would interfere with the operation of assembly 1a.

Piston rod 44 of positioning cylinder 40 has a length sufficient that when extremity 54 contacts limit switch 71, placement cylinders 80 and the vacuum cups carried thereby are positioned in horizontal alignment with label placement locations 20 in mold cavities 16, FIG. 1. Piston rods 88 of placement cylinders 80 have a length sufficient to place a label 102 in contact with label placement locations 20 when fully extended, and label magazine 100 is positioned to be contacted by vacuum heads 92 when cylinders 30 and 40 are both retracted, FIG. 2, i.e., when lobe 68 is in contact with limit switch 66 and extremity 54 is in contact with limit switch 70.

An alternative embodiment of the above described label transferring device is shown in FIG. 4 for use in placing labels in only one of mold sections 14. Label transferring device 2 is used to apply labels in only one side of the mold. Label transferring device 2 is identical to that of label transferring device 1, with the exception that positioning hydraulic cylinder 40 is mounted on a stationary support base 120 rather than on spacing cylinder 30. Support 120 is secured directly to platen 10. Label magazine 100b is mounted on platen 10 so that its open end 106b lies in approximately the same vertical plane as label placement location 20. Vacuum heads 92 may then access both label placement locations 20 and label magazines 100 without requiring positioning cylinder 40 to be shifted toward and away from platen 10.

OPERATION

In order to operate label transferring device 1 through a complete cycle of the blow molding machine, label transferring device 1 is first positioned with spacing cylinder 30, positioning cylinder 40 and placement cylinders 80 all retracted, FIG. 2. In this position, a label 102 is already placed on label placement locations 20 and mold sections 14, 14a are closed with the parison undergoing the blowing step at the calibration station.

A vacuum is continuously supplied to vacuum heads 92 through vacuum supply lines 56, 96 and hose 60. A vacuum is also continuously supplied to vacuum apertures 18 through bores 19 behind placement locations 20. The negative pressure at manifolds 19 and, thus, ports 18 is greater than that at vacuum head 92. This enables the transfer of a label from a head 92 to a label location 20 without interruption of the vacuum supply to heads 92.

With the mold closed and all cylinders retracted, vacuum heads 92 contact the exposed labels 102 in magazines 100. At or about this point in the cycle, blowing of the parison has been completed and the platens are moved to the position shown in FIG. 1 separating the mold halves 14 and 14a. The resulting containers with labels affixed to either side thereof are removed from the calibration station in any conventional fashion.

Spacing cylinders 30 and 30a are activated so as to extend piston rods 32 and 32a. Piston rods 32 and 32a do not extend positioning cylinders 40 beyond part line 104 so that label transferring device 1 and 1a on both sides of the platens may be simultaneously activated without interfering with each other, FIG. 1. When piston rods 32 and 32a are fully extended, full out limit switches 67 and 67a are contacted by lobes 69 and 69a on control rods 62 and 62a and positioning cylinders 40 and 40a are activated. Piston rods 44 and 44a are then extended to position placement cylinders 80 and 80a in horizontal registry with label placement locations 17 and 17a. When piston rods 44 and 44a are fully extended, limit switches 71 and 71a are contacted by protruding ends 54 and 54a of rods 44 and 44a and placement cylinders 80 and 80a are thereby activated.

When activated, placement cylinders 80 and 80a extend for a timed duration and press labels 102 and 102a against label placement locations 20 and 20a, FIG. 1. The vacuum supplied to label placement locations 20 and 20a is greater than the vacuum supplied to vacuum heads 92 and 92a so that when rods 88 and 88a retract, labels 102 and 102a are removed from heads 92 and 92a and remain adhered to label locations 20 and 20a. When rods 88 and 88a are retracted after their timed duration, piston rods 44 and 44a on positioning cylinders 40 and 40a are retracted. When full in limit switches 70 and 70a are contacted by protruding ends 54 and 54a, spacing cylinders 30 and 30a are activated and piston rods 32 and 32a retracted. Mold sections 14 and 14a may then be transferred to the extrusion station and close on a new parison. Note that this transfer may be taking place, if desired, during the period the labels 102 and 102a are being placed in the mold. When piston rods 32 and 32a are fully retracted so that limit switches 66 and 66a are contacted by lobes 68 and 68a on control rods 62 and 62a, placement cylinders 80 and 80a again contact a label 102, 102a for a new cycle, FIG. 2.

The operation of label transferring device 2 is the same as that described above, with the exceptions that positioning cylinder 40b is always maintained in extended position, and rod 88b must be extended to bring cup 92b into contact with a new label at magazine 100b. Positioning cylinder 40b merely needs to extend in order to position placement cylinders 80b as described above.

With the above label transferring device, it will be recognized that device 1 can place a label 102 in mold section 14 while platens 10 are moving from one blow molding station to another, thus greatly reducing the lag time between cycles. Since the label supply 100 is also carried on platens 10, device 1 may obtain a new label while the mold is closed and is being shifted between blow molding stations. Since the label transferring device 1 is carried on platens 10, device 1 is always maintained in registry with mold sections 14.

Those skilled in the art will realize that various different types of cylinders, such as pneumatic and/or hydraulic cylinders, or positioning devices as well as different control mechanisms for activating transferring device 1 can be utilized. The label magazine may supply a continuous strip of labels which are fed in from the side of vacuum heads 92 rather than extending in a stack through the platens. Further, other securing methods could be used to secure labels 102 to transferring device 1 or to the mold once the labels have been placed within the cavity. Therefore, from the foregoing description, it will be readily appreciated by those skilled in the art that modifications and improvements may be made to the invention without departing from the concepts disclosed herein. The scope of protection is to be determined by the claims which follow and the breadth of interpretation which the law allows.

The embodiments of the invention in which an exclusive property or privilege is claimed are defined as follows:

1. A blow molding machine having
    a pair of opposed platens mounted on tie rods for movement toward and away from each other, each platen mounting a mold half thereon, wherein the mold halves mate with each other when closed, thereby forming the shape of the object to be molded,
    a label magazine fixedly mounted to the said platen and including a means for supporting a pack of labels in a stack to be picked from the stack one at a time,
    a support arm also fixedly connected to the platen,
    said support arm supporting a piston and cylinder unit which has an extendable element which is extendable toward and away from the mold half between and extended position and a retracted position,
    a placement means located on the end of the extendable element,
    the placement means facing the mold cavity when the extendable element is in its said extended position, and said placement means facing the label magazine when the extendable element is in its retracted position,
    said placement means having a suction head and said placement means being extendable and retractable relative to the extendable element of the piston and cylinder unit, wherein, when the extendable element of the piston and cylinder unit is in its retracted position the placement means is extendable to pick up a label from the label magazine and retract, holding a label thereon by suction, and wherein when the extendable element of the piston and cylinder unit is in its extended position the placement means is extendable into the mold half to place the label against the interior thereof,
    and means for extending and retracting the support arm in a direction generally parallel to the direction of movement of the platens and mold halves towards and away from each other, between a retracted position at which the extendable element is moved toward its platen and an extendable position at which the extendable element is moved to a location for said movement between the mold halves for movement of its placement means into a mold half.

2. A blow molding machine according the claim 1, said label magazine arranged to feed labels in a direction parallel to the direction of movement of the mold halves towards and away from each other.

3. A blow molding machine according the claim 2, said extendable element being extendable in a direction perpendicular to the direction of movement of the mold halves towards and away from each other, and the placement means being extendable and retractable parallel to the direction of movement of the mold halves towards and away from each other.

4. A blow molding machine according the claim 3, said suction head comprising a flexible cup with means for supplying vacuum to that cup.

5. A blow molding machine according the claim 1, said support arm extending from the platen parallel to the direction of movement of the mold halves toward and away from each other, and the extendable element extending perpendicular to the support arm.

6. A blow molding machine according to claim 1, wherein said piston and cylinder unit, said placement means and said means for extending and retracting the support arm are all fluid operated.

7. A blow molding machine according to claim 1, wherein said suction head is a flexible cup, and including means for supplying vacuum pressure to said cup.

8. A blow molding machine having a pair of opposed platens mounted on the tie rods for movement toward and away from each other, each platen mounting a mold half thereon, the mold halves forming a cavity when closed upon each other to form the shape of the object to be molded,
    at least one of said platens including a portion extending laterally relative to the mold half mounted thereon,
    a label magazine fixed to the said portion of the platen and including a means for supporting a pack of labels in a stack to be picked from the stack, one at a time, the stack extending in a direction parallel to the direction of movement of the mold halves toward and away from each other,
    a support arm also connected to the said portion of the platen at a location along a line which extends from the mold half cavity toward and beyond said label magazine, the support arm being located on said line on the opposite side of said label magazine from the mold half,
    said support arm supporting a piston and cylinder unit at its outer end, away from said platen portion, said piston and cylinder unit including an extendable element cantilever mounted at the support arm and extendable toward and away from the mold half in a direction perpendicular to said direction of movement of the mold half toward and away from each other, said extendable element being movable between an extended position and a retracted position,
    a placement means located on the end of the extendable element,
    the placement means facing the mold cavity when the extendable element is in its extended position and said placement means facing the label magazine when the extendable element is in its retracted position, said placement means having a suction head facing toward the platen, and said placement means being extendable and retractable in a direction perpendicular to the direction of movement of the extendable element and parallel to the line of movement of the platens toward and away from each other, wherein, when the extendable element is in its retracted position the placement means is extendable to pick up a label from the label magazine and to retract, holding a label thereon, and wherein when the extendable element is in its extended position the placement means is extendable into the mold half to place the label against the interior thereof, and means for extending and retracting the support arm in a direction generally parallel to the direction of movement of the platens and mold halves towards and away from each other, between a retracted position at which the extendable element is moved toward its platen and an extendable position at which the extendable element is moved to a location for said movement between the mold halves for movement of its placement means into a mold half.

9. A blow molding machine according to claim 8, wherein each of said platens has one of said support arms mounted thereon, each with its respective piston and cylinder unit and placement means.

* * * * *